United States Patent [19]

Haines et al.

[11] Patent Number: 4,742,469

[45] Date of Patent: May 3, 1988

[54] ELECTRONIC METER CIRCUITRY

[75] Inventors: John G. Haines, Oakland; Albert L. Pion; Elizabeth A. Simon, both of Berkeley; Christopher M. Mayer, San Mateo, all of Calif.

[73] Assignee: F.M.E. Corporation, Hayward, Calif.

[21] Appl. No.: 795,139

[22] Filed: Oct. 31, 1985

[51] Int. Cl.$^4$ .................. G06F 15/20; G06F 12/14; G06F 12/16

[52] U.S. Cl. .................. 364/466; 364/200; 364/900; 371/7

[58] Field of Search .............. 364/200, 900, 464, 466; 371/10, 13, 15, 16, 21, 26, 29, 68, 7

[56] References Cited

U.S. PATENT DOCUMENTS

| | | | |
|---|---|---|---|
| 4,484,307 | 11/1984 | Quatse et al. | 364/900 |
| 4,541,053 | 9/1985 | Knoth et al. | 364/466 |
| 4,547,853 | 10/1985 | Eckert | 364/464 |
| 4,577,283 | 3/1986 | Soderberg et al. | 364/464 |
| 4,578,774 | 3/1986 | Muller | 364/466 |
| 4,628,476 | 12/1986 | Duwel | 364/464 |
| 4,644,541 | 2/1987 | Linkowski | 371/21 |
| 4,660,198 | 4/1987 | Lyon | 371/29 |
| 4,665,477 | 5/1987 | Desmazieres | 371/68 |

FOREIGN PATENT DOCUMENTS 0019515 11/1980 European Pat. Off. .......... 364/466

*Primary Examiner*—Parshotam S. Lall
*Assistant Examiner*—Kevin J. Teska
*Attorney, Agent, or Firm*—Townsend and Townsend

[57] ABSTRACT

An improved electronic postage meter which includes a microcomputer (17), redundant memories ("BAMs") (35a–b), and fault flip-flops (30a–b). Improved circuitry for controlling the writing to the BAMs includes a timer ("BAM-protection timer") (40) coupled to the write-enable input of each of the BAMs. The BAM-protection timer has a trigger input (43) coupled to the microcomputer. The microcomputer is programmed to execute an instruction to generate a triggering signal at the BAM-protection timer's trigger input immediately prior to executing an instruction to write to the BAM. This opens a window for writing; the duration of the window is set to be just long enough to allow the completion of the write operation. The fault flip-flops, once set, unconditionally prevent writing to the BAMs, regardless of any other signals that might be present. The setting of the fault flip-flops is controlled by a first timer ("watchdog timer") (60) and a second timer ("second-chance timer") (62). In normal operation, the microcomputer periodically generates a trigger signal for the watchdog and second-chance timers. The watchdog interval exceeds the maximum interval between triggers under normal conditions. If a trigger is not received, the watchdog timer resets the microcomputer. The second-chance interval is longer than the watchdog interval, so that the second-chance timer times out and sets the fault flip-flops only if the restart still fails to produce a trigger signal within the specified time.

8 Claims, 3 Drawing Sheets

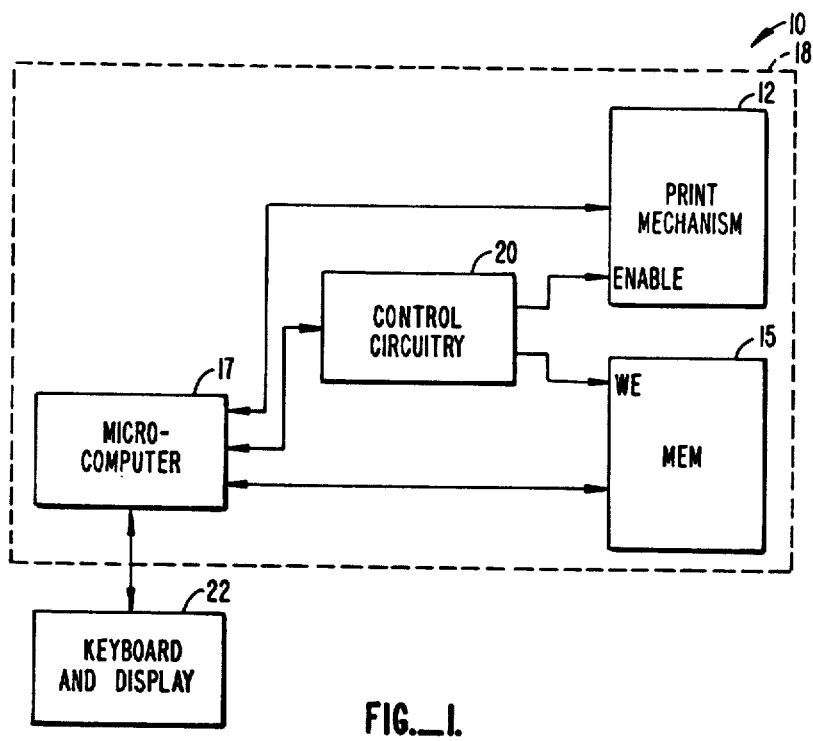
FIG._1.
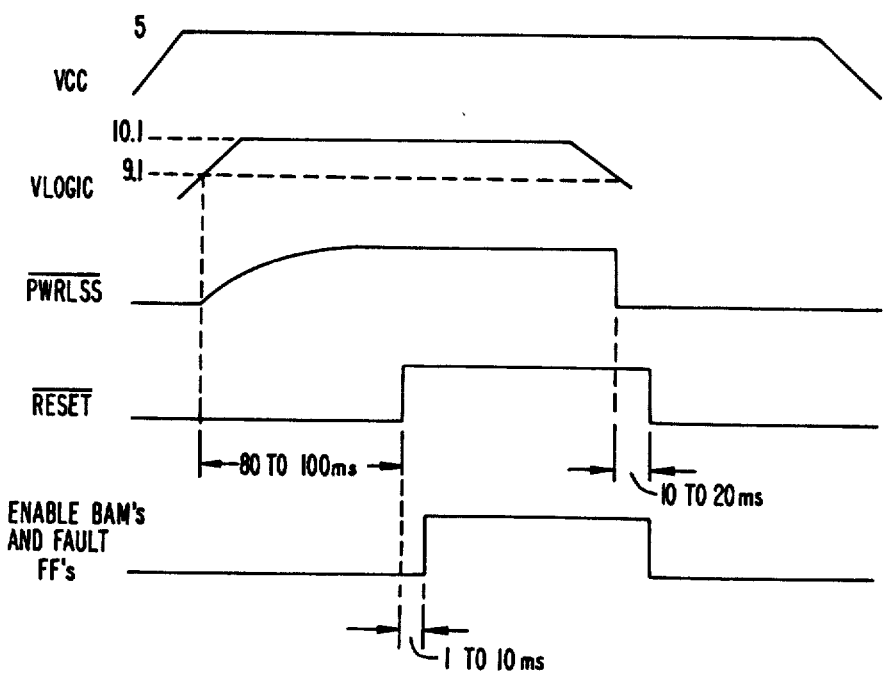
FIG._4.

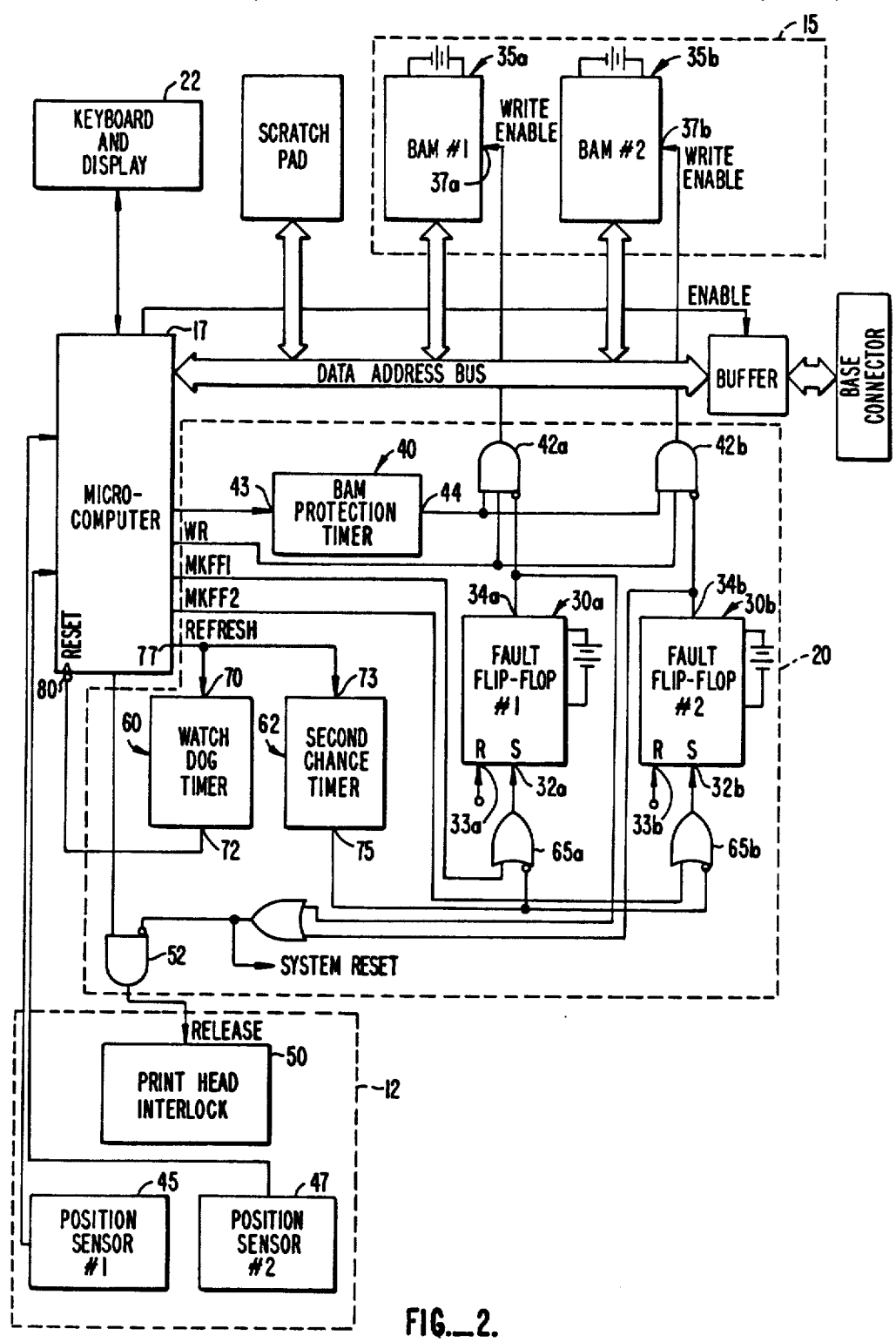
FIG._2.

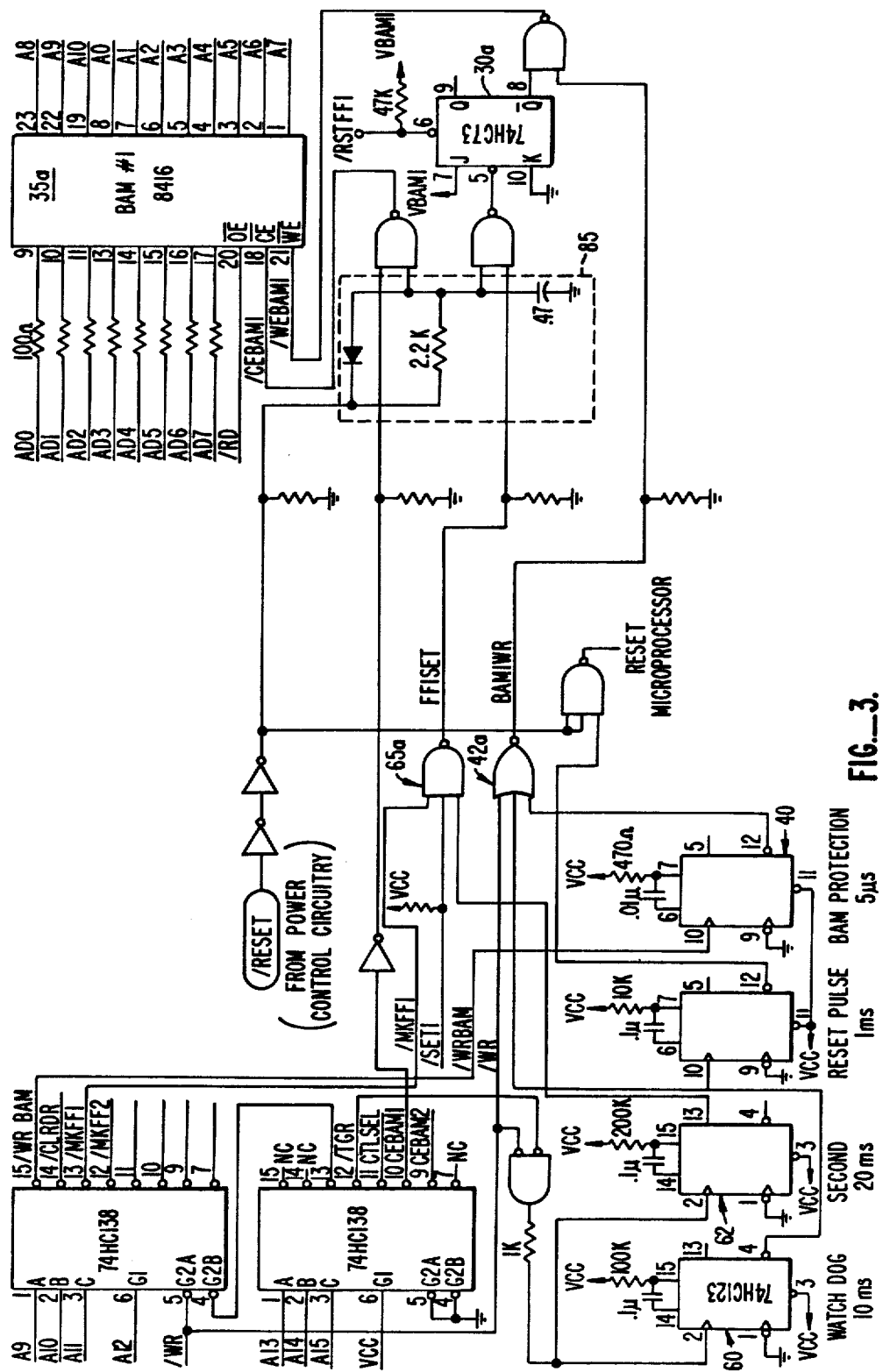
FIG._3.

ELECTRONIC METER CIRCUITRY

FIELD OF THE INVENTION

The present invention relates generally to electronic postage meters, and more specifically to improvements in the circuitry for preserving the integrity of the meters' accounting data registers.

BACKGROUND OF THE INVENTION

The heart of a postage meter, whether electronic or mechanical, is a postage printing mechanism and a set of registers containing accounting data directly representative of postal credit. Accordingly, the paramount design objective is to make sure that printing occurs only with a corresponding updating of the accounting registers. In recent years, mechanical meters utilizing complex and intricate mechanical interlocking schemes have begun giving way to electronic meters in which a microcomputer controls and verifies the printing of postage and updating of accounting registers.

U.S. Pat. No. 4,484,307 to Quatse et al. describes an electronic postage meter having improved security and fault tolerance features. The Quatse et al. meter represented a significant advance in the development of electronic postage meters in that the meter not only verified proper operation, but verified its ability to verify proper operation. Thus, the design acknowledged the fallibility of the electronic components, incorporated an appropriate level of redundancy into the circuitry, and provided the capability of sensing a loss of redundancy that threatened data security. The meter was configured so that any failure that threatened the data security would incapacitate the meter in a manner that prevented further operation until the meter had been returned to the factory. Where the failure was the loss of one level of redundancy, the remaining level of protection still allowed reconstruction of the accounting data.

The circuitry of the Quatse et al. meter comprises a microcomputer, a pair of battery-backed CMOS memories (BAM's), a pair of battery-backed flip-flops, and a timer. The microcomputer checks for agreement between the corresponding data in the BAMs, verifies data written to the BAMs by reading after each write operation, and monitors feedback signals to ensure proper sequencing of the printing mechanism. The flip-flops, which have two states, are coupled to the BAMs and the printing mechanism. In the first state ("normal state"), writing to the BAMs and printing of postage can occur under microcomputer control. In the second state ("faulted state"), writing to the BAMs and actuation of the printing mechanism are prevented. The flip-flops, once set to the faulted state, cannot be reset to the normal state without access to the interior of the secure housing.

The timer has a trigger input coupled to the microcomputer and an output coupled to the flip-flops. Upon receipt of a triggering signal at its trigger input, the timer is temporarily kept from setting the flip-flops to the faulted state for a predetermined interval ("time-out interval"). If another triggering signal is not received within the time-out interval, the flip-flops are set to the faulted state.

Under normal operation, the microcomputer issues a triggering signal at intervals less than the time-out interval, thereby maintaining the flip-flops in the normal states. In the event that a failure is detected, the microcomputer writes an appropriate fault code into the BAMs and suppresses the triggering signal. The timer output then changes and the fault flip-flops are set to the faulted state. In the event that the trigger does not occur for other reasons, the flip-flops are set as above, but no fault code is written.

The Quatse et al. meter was ultimately implemented in a line of commercial products, including a meter known as the Friden Alcatel Model 9250. Several years of operation have shown the Model 9250 to be highly reliable, with an average of about twenty million cycles between failures. An analysis of meters that actually faulted and were returned to the factory revealed that about half the faults were due to the failure of a mechanical or electrical component. In the remaining cases, the fault was due to some electrical noise in the system.

SUMMARY OF THE INVENTION

The present invention provides improved electronic postage meter circuitry that reduces the incidence of noise-related shutdowns while enhancing the meter's security and fault tolerance capabilities.

In brief, the meter, which includes a microcomputer, redundant BAMs, and fault flip-flops, is provided with improved circuitry for controlling writing to the BAMs and setting the fault flip-flops.

According to a first aspect of the invention, improved circuitry for controlling the writing to the BAMs includes a timer ("BAM-protection timer") coupled to the write-enable input of each of the BAMs. The BAM-protection timer has a trigger input coupled to the microcomputer. The microcomputer is programmed to execute an instruction to generate a triggering signal at the BAM-protection timer's trigger input immediately prior to executing an instruction to write to the BAM. This opens a window for writing; the duration of the window is set to be just long enough to allow the completion of the write operation. The write-enable input is also conditioned by the state of the fault flip-flops. The fault flip-flops, once set, unconditionally prevent writing to the BAMs, regardless of any other signals that might be present. Additionally, the enabling of the BAM chip is controlled by the microcomputer, subject to override protection under low power conditions.

According to a second aspect of the invention, the setting of the fault flip-flops is controlled by a timing circuit that includes a first timer ("watchdog timer") and a second timer ("second-chance timer"). Each of the timers has a trigger input coupled to the microcomputer. The watchdog timer's output is coupled to the microcomputer's reset input. The second-chance timer's output is coupled to the set input on the fault flip-flops. In normal operation, the microcomputer periodically executes an instruction to generate a trigger signal for the watchdog and second-chance timers. The watchdog timer interval is set to exceed the maximum interval between triggers under normal conditions. In the event that a trigger is not received, the watchdog timer resets the microcomputer, causing the program execution to restart. The second-chance timer is set to have a timing interval longer than that of the watchdog timer, so that the second-chance timer times out only if the restart still fails to produce a trigger signal within the specified time. If the microcomputer detects a failure, it sets the fault flip-flops directly.

A further understanding of the nature and advantages of the present invention can be realized by reference to the remaining portions of the specification and the attached drawings.

BRIEF DESCRIPTION OF THE DRAWINGS

FIG. 1 is a block diagram illustrating the basic subsystems of an electronic postage meter;

FIG. 2 is a logic block diagram illustrating the control circuitry in greater detail;

FIG. 3 is a circuit schematic illustrating portions of the control circuitry; and FIG. 4 is a timing diagram of the signals that control operation during power cycling.

DESCRIPTION OF THE PREFERRED EMBODIMENT

FIG. 1 is a block diagram illustrating the basic subsystems of an electronic postage meter 10. The basic subsystems include a print mechanism 12 for printing value indicia such as postage, a memory 15 for storing a number of items of accounting information, and a microcomputer 17 for controlling the setting and actuation of the print mechanism and updating the values of the information stored in memory 15. Print mechanism 12, memory 15, and microcomputer 17 are located within a secure housing 18 to maintain security of the print mechanism and accounting data. Additional control circuitry 20, also located within the secure housing, receives and generates various timing and validation signals to prevent unintended actuation of print mechanism 12 and unintended writing into memory 15. A keyboard and display, collectively designated 22, are located outside the secure housing and provide a user interface to microcomputer 17. The microcomputer operates according to a program stored in an associated read-only memory ("ROM") and utilizes an associated read-write random-access memory ("RAM") as a scratchpad. These memories may be physically separate integrated circuit elements or may be part of the same chip as the processor.

The present invention provides certain improvements beyond those shown in U.S. Pat. No. 4,484,307, issued Nov. 20, 1984, to Quatse et al., for An Electronic Postage Meter Having Improved Security and Fault Tolerance Features. The disclosure of the Quatse et al. patent is incorporated herein by reference.

FIG. 2 is a block diagram illustrating the subsystems of postage meter 10 at a greater level of detail, and shows the major control paths for signals provided to and originating from control circuitry 20. Gates and signals are shown in a logical sense (as if active high) without regard to whether the actual implementation is active high or active low. Additionally, while certain input and output terminals are shown in a manner suggesting direct connections between elements, the actual circuit implementation sometimes includes intervening circuit elements such as gates and decoders.

A significant aspect of the prior art electronic postage meter, carried forward and expanded in the present invention, is the redundancy of certain key elements to maintain data integrity in the event of a single-component failure. Microcomputer 17 verifies that each meter function is properly carried out, and cooperates with control circuitry 20 to disable the meter in the event of an error condition. Moreover, the control circuitry operates independently to disable the meter in the event that the microcomputer loses the ability to verify proper operation.

In this context, disabling the meter means preventing the actuation of print mechanism 12 and preventing data from being written into memory 15. To this end, control circuitry 20 includes what may be referred to as "non-user-resettable" means, which is set upon the occurrence of a fault or error condition, and when set, overrides any attempt to write into memory 15 or actuate the print mechanism. The non-user resettable means is implemented as a pair of battery-backed fault flip-flops 30a-b (for redundancy). The fault flip-flops have respective set inputs 32a-b, reset inputs 33a-b, and outputs 34a-b. Once set, the flip-flops are beyond the control of the microcomputer for resetting, and cannot be reset except by a person gaining access to the interior of secure housing 18. As will be discussed below, the state of fault flip-flops 30a-b is provided to gates that control the signals that allow writing to memory 15 and release the print mechanism.

Memory 15 is implemented as a pair of battery-augmented memory elements 35a-b (referred to as "BAMs"), which have respective chip-enable inputs (not shown in FIG. 2) and write-enable inputs 37a-b. The microcomputer controls the chip-enable inputs. The circuitry for controlling writing into BAMs 35a-b includes a BAM-protection timer 40 and a pair of gates 42a-b. BAM-protection timer 40 has a trigger input terminal 43 and an output 44. Timer 40 is a retriggerable monostable multivibrator (one-shot) element that operates to hold its output 44 true for a predetermined interval following the receipt of an appropriate triggering signal at its trigger input 43.

BAM-protection output 44 is coupled to respective first inputs of both gates 42a-b. Microcomputer 17 controls a write output, designated WR, which is coupled to respective second inputs of both gates 42a-b. Each of flip-flop outputs 34a-b is coupled to one of respective third inputs of gates 42a-b. In the event that the fault flip-flops are set, write-enable inputs 37a-b are held unconditionally false, thereby preventing writing. Assuming the fault flip-flops are not set, as is the normal case, the write-enable inputs are controlled by BAM-protection output 44 and the WR output from the microcomputer.

The output of BAM-protection timer 40 is normally false, thereby preventing writing. BAM-protection trigger input 43 is controlled by microcomputer 17, which is programmed so that it executes an instruction causing the generation of a triggering signal immediately prior to any instruction seeking to write into BAMs 35a-b. The sequence for writing into BAM entails triggering BAM-protection timer 40, asserting the chip-enable, and then asserting the WR signal. The length of time that the BAM-protection timer 40 keeps its output true following such a trigger input is designed to be just long enough to allow the completion of the subsequent BAM write. In the particular embodiment shown, this is on the order of 5 microseconds.

Operation of print mechanism 12 is similarly controlled by microcomputer 17, subject to override should fault flip-flops 30a-b be set. Print mechanism 12 includes a movable print head having relatively movable print elements such as print wheels. Associated with the print mechanism are optical position sensors 45 and 47, and a print head interlock element 50, which is preferably a solenoid that locks the print mechanism unless energized. Interlock element 50 is controlled by the output of a gate 52, one input of which is conditioned by fault flip-flop outputs 34a-b and the other input of which is conditioned by signals from the microcomputer. As long as the fault flip-flops are not set, the microcomputer can control the energization of the solenoid to release the print head. However, if the fault flip-flops are set, the print head is locked beyond the control of microcomputer 17.

Fault flip-flops 30a–b may be set directly by microcomputer 17, or may be set by specific hardware in the event that microcomputer 17 fails to execute its normal operating sequence properly. The circuitry that controls fault flip-flop set inputs 32a–b includes a watchdog timer 60, a second-chance timer 62, and a pair of gates 65a–b. Timer 60 has a trigger input 70 and an output 72. Timer 62 has a trigger input 73 and an output 75. Each of timers 60 and 62 is a monostable multivibrator that operates to hold its output true for a particular predetermined interval following the appearance of an appropriate signal at its trigger input.

The microcomputer is capable of issuing a triggering signal ("refresh signal") at an output 77 ("refresh output"). The microcomputer also has a reset input 80 that causes the microcomputer to restart from an initial state upon the receipt of an appropriate signal.

Watchdog trigger input 70 is coupled to refresh output 77; watchdog output 72 is coupled to reset input 80. Microcomputer 17 is thus forced to restart if watchdog output 72 goes false.

Second-chance input 73 is also coupled to refresh output 77; second-chance output 75 is coupled to both of respective first inputs of gates 65a–b. Microcomputer 17 has separate outputs, designated MKFF1 and MKFF2, which are communicated to each of respective second inputs of gates 65a–b. The outputs of gates 65a–b control set inputs 32a–b of fault flip-flops 30a–b. Thus, the fault flip-flops are set if second-chance output 75 goes false or if microcomputer 17 issues the MKFF1 and MKFF2 signals.

FIG. 3 is a circuit schematic showing the various timers described above and one each of the BAMs and fault flip-flops. Reference numerals corresponding to those in FIG. 2 are used where appropriate.

FIG. 4 is a timing diagram illustrating the waveforms of signals that control the operation during power cycling and ensure that operation can only occur when the power is sufficient for reliable operation. Thus, the microcomputer is not enabled until 80–100 milliseconds after power is up, and remains in operation (on reserve power) for 10–20 milliseconds after a power loss interrupt to allow completion of current operations.

On power-up, second-chance output 75 is initially false since the timer hasn't been triggered yet. Each of fault flip-flops 30a–b has an associated resistor/capacitor network, one of which, designated 85, is shown in FIG. 3. Networks 85 temporarily prevent the output of the relevant one of gates 65a–b from controlling the setting of the flip-flops at power up. Specifically, fault flip-flops 30a–b are prevented from being set for about 1 millisecond after the microcomputer is initially enabled by the /RST signal going high. Each of the networks also keeps a respective one of BAMs 35a–b disabled during this time.

The normal operation of microcomputer 17 commences on power-up from an initial known state, whereupon the microcomputer proceeds to execute a main program loop from which it exits to perform various tasks. For example, on receipt of signals indicative of a command to print postage, the microcomputer executes routines to set the print elements in the print head to appropriate values, to release the print head solenoid, to actuate the print head, and to update the contents of appropriate locations in BAMs 35a–b. The BAM update is initiated when signals from position sensors 45 and 47 indicate that the print head has moved from its home locations, and is accomplished in a number of steps, each on the order of 4–8 milliseconds in duration. Each step is performed on a separate pass through the system program.

Microcomputer 17 issues the refresh signal at a particular point in the main program loop. At idle, when there is no BAM updating or print head movement, the program repeats at an interval of approximately 50 microseconds, so that the refresh signal is issued at 50-microsecond intervals. During BAM updating, the interval may be as long as 8 milliseconds. The first refresh signal is issued about 20 microseconds after initialization. This sets watchdog timer 60 and second-chance timer 62 properly before the 1-millisecond interval provided by network 85 above elapses.

During operation, microcomputer 17 performs numerous checks on the memory, the print mechanism, and the microcomputer operation itself. If an error is discovered, the meter is disabled in a manner that is appropriate for the severity of the problem. There are basically two types of problems, namely those that threaten data security and those that don't. In the case of the former, referred to as "hard faults," the microcomputer issues instructions that cause the setting of the fault flip-flops. The latter problem, referred to as "soft faults," are presumed to be transitory in cause and effect, and are handled by suspending operation.

As alluded to above, hard faults are those error conditions that threaten data security, and require the drastic action of setting fault flip-flops 30a–b. Prior to setting the fault flip-flops, the microcomputer writes a fault code into BAMs 35a–b as an aid to determining the nature of the fault when the meter is returned to the factory for servicing. Table 1 sets forth the fault codes that are written into the BAMs. Some of the fault codes relate to failures of the print mechanism. Examples are improperly timed signals from print head position sensors 45 and 47, and inconsistencies between the state of print head interlock 50 and other instructions. Other fault codes relate to errors in the data stored in BAMs 35a–b. These include disagreement between nominally identical registers in the two BAMs, and failures of the values within a given BAM to conform to arithmetic constraints (the accounting registers include ascending and descending registers and a control total for extra redundancy). It is noted that no fault code is written if the microcomputer fails to issue the required triggering signal within the 1 millisecond interval of power-up. In such a case, the second-chance timer output is never set true and the fault flip-flops are set as soon as they are enabled.

As alluded to above, soft faults are those problems that do not threaten the security or integrity of the data in the BAMs or represent a threat of printing value indicia without properly accounting for them, but do represent abnormal conditions that are believed to be of a transitory nature. In response to detecting a soft fault condition, the microcomputer displays a soft fault code on the display, writes the code into BAM (where the most recent 16 soft fault codes are stored), and traps in a loop. When in this loop, the microcomputer executes only the instructions necessary to issue the refresh signal and read the keyboard. Table 2 shows the fault codes for the soft faults.

The basic constraints on the characteristic intervals for watchdog timer 60 and second-chance timer 62 are best understood in the context of the overall operation of the timers. It will be appreciated that if too long a period elapses between refresh signals, watchdog timer 60 will cause a reset signal to appear at reset input 80, restarting the program execution. If a refresh signal is still not forthcoming, the longer interval characteristic of second chance timer 62 elapses, whereupon second-chance output 75 goes false, setting fault flip-flops 30a–b.

Thus, in normal operation, from power-up, the first refresh will occur within 20 microseconds of restart, and at subsequent intervals thereafter, ranging from about 50 microseconds to about 8 milliseconds. The interval for watchdog timer 60 is set to exceed the maximum time between refreshes so that in normal operation, output terminal 72 remains true. An interval of 10 milliseconds is chosen.

The purpose of second-chance timer is to cause the fault flip-flops to be set if resetting the microcomputer still fails to result in a refresh signal within the normal time interval. Accordingly, the interval for second-chance timer 75 is set to exceed the sum of the interval for watchdog timer 60 and the normal expected time after a reset for the first refresh. An interval of 20 milliseconds is chosen, although a somewhat shorter interval would be suitable. It is noted, however, that if no refresh signal is issued within the 1-millisecond interval following power up, second-chance output 75 stays false, and the fault flip-flops are set as soon as they are enabled. This is appropriate since a failure to issue the initial refresh signal is likely to signify a problem with the microcomputer.

In conclusion it can be seen that the present invention provides improved control circuitry within an electronic postage meter. The accounting registers are protected from writing except during very short time windows, thereby preventing transients and noise from causing spurious data to be written. Moreover, the use of separate watchdog and second-chance timers for controlling the fault flip-flops further reflects a recognition that certain failures to trigger the timers represent a threat to the data security while other failures may well be transitory in nature.

While the above is a full description of the present invention and its preferred embodiment, various modifications, alternate constructions, and equivalents may be employed. Therefore, the above description and illustration should not be taken as limiting the scope of the invention, which is defined by the appended claims.

TABLE 1

| Code Number | HARD FAULT Description |
|---|---|
| 00 | Component failure or noise. |
| 20 | Home sensor 1 is out of service. |
| 30 | Rotation past solenoid stop and not in print cycle. |
| 50 | BAM register data not in BCD format. |
| 51 | BAM byte data not in expected format. (Out of range.) |
| 60 | AR + DR not equal to CT. |
| 61 | Lock-Up flip-flop set by test mode sequence. |
| 62 | Battery Timer expired. |
| 70 | Accounting register set A not equal to B within a BAM. |
| 71 | BAM1 not equal to BAM2. |
| 72 | Register read after write verify failure. |
| 73 | Byte read after write verify failure. |

TABLE 2

| Code Number | SOFT FAULT Description |
|---|---|
| 01 | 8031 memory error detected. |
| 02 | 8031 Interrupts stopped. |
| 09 | Apparent position sensor failure. |
| 10 | No clutch signal received during print cycle. |
| 11 | Clutch signal received when not in print cycle. |
| 12 | Attempt to print when not enough money. |
| 13 | Didn't position value wheels fast enough. |
| 14 | Value printed not equal to keyboard register. |
| 15 | Stuck key on power up. |
| 16 | Envelope or tape stuck on power up. |
| 17 | Ambiguous value wheel position. |
| 18 | Power up not on a base and no PO key. |
| 40 | Attempt to write using I/O without an active "TEST" input. |
| 41 | Timeout during I/O. |
| 42 | Invalid I/O command received. |
| 43 | Invalid I/O address received. |
| 44 | I/O mode 1 or 2 selected without active "TEST" input. |
| 45 | Invalid I/O mode byte received. |
| 46 | Power up with PO key on. |
| 47 | Power up when out of home. |
| 48 | Out of Home, but not far enough for hard fault. |
| 49 | Keyboard Register contains illegal value. |

What is claimed is:

1. In an electronic postage meter having a programmed microcomputer and a functionally non-volatile memory coupled thereto for storing accounting data, the improvement comprising:
   timer means, having a trigger input coupled to the microcomputer and having an output coupled to the memory, for preventing writing into the memory except during a predetermined interval following the receipt of a triggering signal at said trigger input;
   the microcomputer being programmed to initiate the issuance of said triggering signal to said timer means only immediately prior to the microcomputer's executing an instruction to write into the memory;
   said predetermined interval being sufficiently long to permit execution of said instruction to write into the memory, but not significantly longer, whereupon writing to the memory is normally possible only during normal operation and only when occurring under control of said microcomputer.

2. The electronic postage meter of claim 1, and further comprising:
   means, coupled to an enable input of the memory, for disabling said memory for a predetermined interval following assertion of a signal enabling the microcomputer on power up.

3. The electronic postage meter of claim 2 wherein said means for disabling comprises:

resistor/capacitor means responsive to the signal enabling the microcomputer, for providing a delayed signal representative thereof; and gating means, responsive to a memory-enabling signal from the microcomputer and to the delayed signal, for asserting a logical true signal at said enable input when both the aforesaid signals are asserted.

4. The electronic postage meter of claim 1 wherein said timer means comprises a one-shot multivibrator.

5. In an electronic postage meter including a programmed microcomputer, a memory for storing accounting information, and a printing mechanism, all located within a secure housing, wherein printing of value indicia and updating of the contents of the memory occur under control of the microcomputer to maintain proper accounting of value indicia printed, the improvement comprising:

non-user-resettable means, being located within the secure housing, having a fault input, and being coupled to the printing mechanism and to the memory, for deactivating the meter in response to the appearance of a fault signal at said fault input;

said non-user-resettable means, once set in response to such a fault signal at said fault input, being beyond control of the microcomputer;

means, associated with the microcomputer, for commencing operation from a known initial state;

trigger means, associated with the microcomputer, for issuing a refresh signal within a first predetermined time interval T1 after commencing operation from said initial state and at subsequent intervals no greater than a second predetermined time interval T2 from the previous refresh signal;

reset means, associated with the microcomputer and having a reset input, for causing said microcomputer to commence operation from said initial state in response to a reset signal at said reset input;

first timer means, coupled to said trigger means and to said reset means, for providing a reset signal to said reset input in the event that said trigger means does not issue a refresh signal within a third time interval T3 after the previous refresh signal; and second timer means, coupled to said trigger means and to said non-user-resettable means, for providing a fault signal to said fault input in the event that said trigger means does not issue a refresh signal within a fourth predetermined time interval T4 after the previous refresh signal;

wherein T3 exceeds the maximum of T1 and T2, and wherein T4 exceeds the sum of T1 and T3.

6. The electronic postage meter of claim 5, and further comprising means for disabling said non-user-resettable means for a predetermined interval T5 following the enabling of the microcomputer on power up, during which interval the microcomputer is allowed to commence operation from said initial state, wherein T5 exceeds T1.

7. In an electronic postage meter having a programmed microcomputer and a functionally non-volatile memory coupled thereto for storing accounting data, the memory having a chip enable input and a write enable input, the improvement comprising:

a gate having first and second gate inputs and having an output coupled to the write enable input of the memory;

timer means, having a trigger input coupled to the microcomputer and an output coupled to said first gate input, for maintaining a false level at said first gate input except during a predetermined interval following the receipt of a triggering signal at said trigger input;

the microcomputer being programmed to effect writing of a word into the memory by initiating the issuance of a triggering signal at said trigger input of said timer means, causing a true value to occur at the chip enable input of the memory, and then causing a true value to occur at said second gate input;

said predetermined interval being sufficiently long to permit the microcomputer to write into the memory, but not significantly longer, whereupon writing to the memory is normally possible only during normal operation and when occurring under control of the microcomputer.

8. The electronic postage meter of claim 7 wherein said timer means comprises a one-shot multivibrator.

* * * * *